(No Model.)
J. KENGEL.
VEHICLE SPRING.
No. 329,316. Patented Oct. 27, 1885.
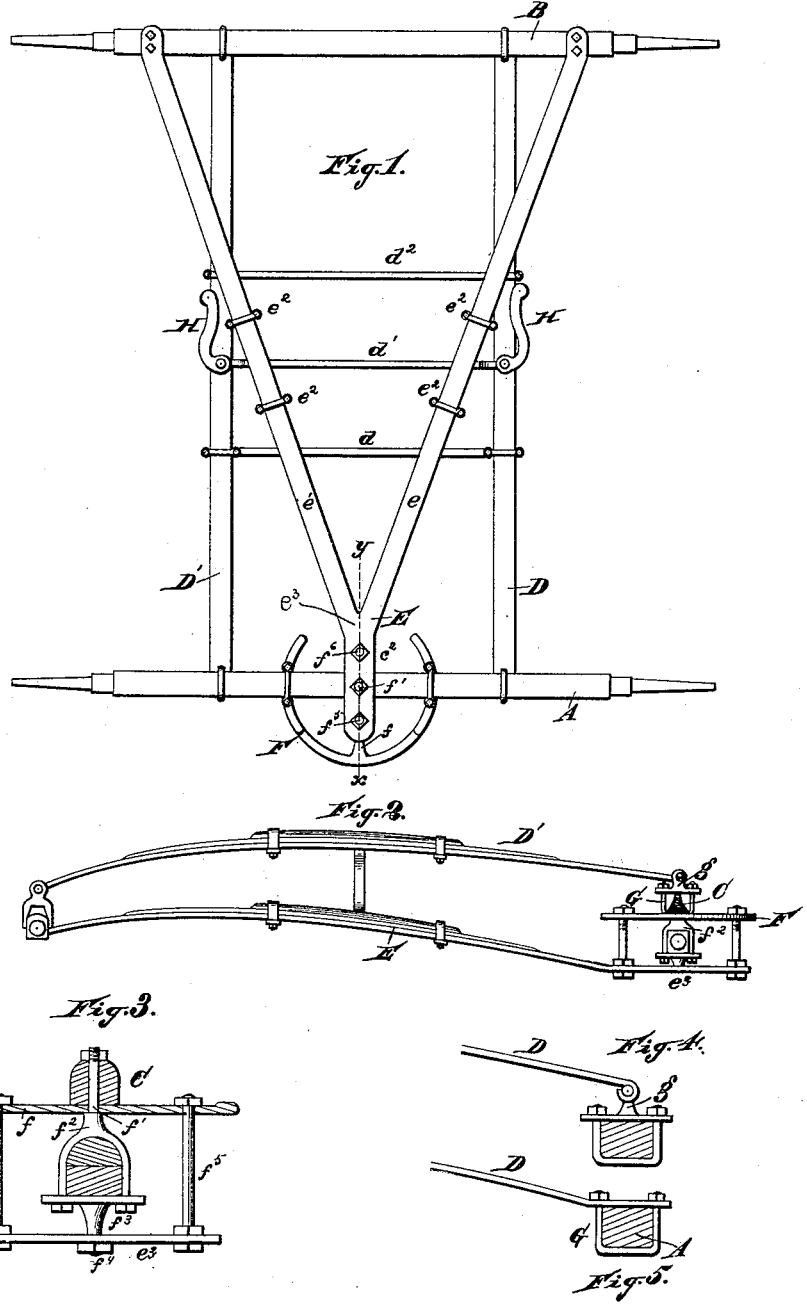
WITNESSES
INVENTOR
Joseph Kengel
By W. W. Leggett
Attorney

UNITED STATES PATENT OFFICE.

JOSEPH KENGEL, OF DETROIT, MICHIGAN.

VEHICLE-SPRING.

SPECIFICATION forming part of Letters Patent No. 329,316, dated October 27, 1885.

Application filed August 15, 1885. Serial No. 174,501. (No model.)

*To all whom it may concern:*

Be it known that I, JOSEPH KENGEL, of Detroit, county of Wayne, State of Michigan, have invented a new and useful Improvement in Vehicle-Springs; and I declare the following to be a full, clear, and exact description of the invention, such as will enable others skilled in the art to which it pertains to make and use the same, reference being had to the accompanying drawings, which form a part of this specification.

My invention relates to improvements in vehicle-springs, and is more particularly designed to provide an improved spring-reach, in combination with other devices, as more fully hereinafter described, and more particularly pointed out in the claim.

In the drawings, Figure 1 is an inverted plan view of a device embodying my invention. Fig. 2 is a side elevation of portions of the same. Fig. 3 is a vertical section through the line $x\,y$, Fig. 1. Figs. 4 and 5 represent methods of attaching the springs to the head-block or axle.

A represents the front axle; B, the rear axle. C is the head-block.

D and D' represent side springs, clipped at their forward ends to the head-block and at their rear ends to the rear axle in any suitable manner.

$d\ d'\ d^2$ represent brace rods connecting said side springs.

E represents a spring-reach, constructed V-shaped, having two branches or arms, $e\ e'$, united at their forward ends, as shown at $e^3$, the rear ends being clipped or otherwise suitably secured to the rear axle and the forward end engaged with the fifth-wheel F of the vehicle. This fifth-wheel is suitably clipped or bolted upon the head-block, and is provided with an arm, $f$, extending between the head-plate and axle, and bolted thereto, as shown at $f'$, by means of a Y-bolt, $f^2$, engaged through the head-block and secured by a nut, the opposite extremities of said bolt clipped to the axle, and provided with a head-plate, $f^3$, arranged to engage the reach and to be connected therewith by means of a nut, $f^4$.

$f^5$ and $f^6$ represent bolts engaging the rib $f$ of the fifth-wheel and the forward end of the reach upon either side of the axle, as shown more particularly in Fig. 3.

The side springs, D D', may be engaged with the head block or axle by an ordinary clip, G, as shown in Fig. 5, although I prefer that the clip shall be provided with a head-plate, $g$, as shown in Fig. 4, and that the spring should have a swiveled engagement thereon, so as to have a rotatable movement, and the end of the spring therewith, although the clip may be passed directly through the end of the spring, thus providing for a rigid fastening, if preferred.

The side springs, D D', may be of any desired construction.

I desire to re-enforce the arms $e\ e'$ of the spring-reach by additional plates, as shown in Fig. 2, said plates being clipped to the main bar of the spring, as shown in Fig. 1 at $e^2$.

H represents a step.

What I claim is—

The combination, with the head-block C and the fifth-wheel F, having the rigid arm $f$, and bolted to the head-block and the axle, and having a head-plate, $f^2$, below the axle, of the spring-reach E, secured to the said head-plate, and bolts $f^5$ and $f^6$, connecting the spring-reach with the rigid arm $f$ of the fifth-wheel in front and in rear of the axle and the head-block, substantially as shown and described.

In testimony whereof I sign this specification in the presence of two witnesses.

JOSEPH KENGEL.

Witnesses:
M. B. O'DOGHERTY,
N. S. WRIGHT.